United States Patent
Tagami

(10) Patent No.: US 7,095,581 B2
(45) Date of Patent: Aug. 22, 2006

(54) MAGNETIC RECORDING AND REPRODUCING APPARATUS WITH RECORDING LAYER HAVING PREDETERMINDED CONVEX-CONCASE PATTERN

(75) Inventor: Katsumichi Tagami, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 11/109,693

(22) Filed: Apr. 20, 2005

(65) Prior Publication Data

US 2006/0007573 A1 Jan. 12, 2006

(30) Foreign Application Priority Data

Jul. 12, 2004 (JP) ............................. 2004-204248

(51) Int. Cl.
*G11B 5/62* (2006.01)
(52) U.S. Cl. .................... 360/77.08; 360/135
(58) Field of Classification Search ............ None
See application file for complete search history.

(56) References Cited

U.S. PATENT DOCUMENTS

| | | | |
|---|---|---|---|
| 5,590,009 A | | 12/1996 | Ishida |
| 6,051,299 A | | 4/2000 | Uchiyama et al. .......... 428/65.3 |
| 6,242,085 B1 | * | 6/2001 | Ryonai et al. ............... 428/332 |
| 6,440,589 B1 | * | 8/2002 | Fullerton et al. ........... 428/826 |
| 6,583,957 B1 | | 6/2003 | Takeshita et al. |
| 6,586,044 B1 | | 7/2003 | Takeshita et al. |
| 6,602,620 B1 | * | 8/2003 | Kikitsu et al. ........... 428/842.2 |
| 2004/0091748 A1 | * | 5/2004 | Kamata et al. .......... 428/694 T |
| 2004/0166376 A1 | * | 8/2004 | Kirino et al. ........ 428/694 TM |
| 2004/0191557 A1 | * | 9/2004 | Kamata et al. ............. 428/611 |
| 2005/0214520 A1 | * | 9/2005 | Oikawa et al. ............. 428/323 |

FOREIGN PATENT DOCUMENTS

| JP | 6-111502 | 4/1994 |
|---|---|---|
| JP | 10-222944 | 8/1998 |
| JP | 11-328662 | 11/1999 |
| JP | 2000-195042 | 7/2000 |

* cited by examiner

Primary Examiner—K. Wong
Assistant Examiner—James L Habermehl
(74) Attorney, Agent, or Firm—Oblon, Spivak, McClelland, Maier & Neustadt, P.C.

(57) ABSTRACT

A convex structure, where a servo signal is recorded, of a perpendicular magnetic recording medium is set to a truncated quadrangular pyramid shape and a specification of the truncated quadrangular pyramid shape and so forth are determined according to properties of the perpendicular magnetic recording medium to be used, so that the influence of a demagnetizing field that accelerates thermal fluctuation of the perpendicular magnetic recording medium can be reduced in a servo area of the medium which is most affected by the thermal fluctuation of the medium. Therefore, it is possible to provide a magnetic recording and reproducing apparatus having the magnetic recording medium that can suppress degradation of the servo signal caused by the thermal fluctuation of magnetization of perpendicular magnetic recording layers forming a convex-concave structure in the servo area to thereby ensure a stable servo function over the long term.

18 Claims, 5 Drawing Sheets

MAGNETIC RECORDING AND REPRODUCING APPARATUS WITH RECORDING LAYER HAVING PREDETERMINDED CONVEX-CONCASE PATTERN

BACKGROUND OF THE INVENTION

1. Field of the Invention

The present invention relates to a magnetic recording and reproducing apparatus including a magnetic recording medium having a magnetic recording layer formed in a predetermined convex-concave pattern on a substrate and thus having so-called servo areas and information data areas (a magnetic recording medium of a discrete type) and a magnetic head for detecting servo signals on the magnetic recording medium and recording and reproducing information data on and from the medium.

2. Description of the Related Art

Improvement in areal recording density of magnetic recording mediums such as hard disks has conventionally been achieved by techniques of both (1) improving the linear recording density and (2) improving the track density. In order to achieve further and higher densification in future, it is necessary to improve the areal recording density based on the foregoing both techniques.

With respect to improving the track density, there have been raised problems of processing limitation about magnetic heads, side-fringe or crosstalk caused by expansion of magnetic fields of magnetic heads, and so forth, and therefore, it can be said that the improvement in areal recording density by progressing the track-density increasing technique for magnetic heads, which is merely an extension of the conventional improvement technique, has reached the limit.

On the other hand, as a technique of improving the linear recording density, reduction in layer thickness and higher coercive forces have been achieved in conventional longitudinal magnetic mediums. However, in terms of further and higher densification of the mediums and stability of recording magnetization against thermal fluctuation, attention has been paid to perpendicular magnetic recording mediums.

Under these circumstances, as a technique of improving the areal recording density and supplementing the higher track densification of the magnetic heads, there have been proposed magnetic recording mediums of a discrete track disk type in which a recording layer is formed in a predetermined convex-concave pattern. For example, JP-A-H11-328662 discloses a magnetic recording medium in which predetermined convex and concave portions are formed on a substrate and a perpendicular magnetic layer in the form of a single layer is formed along the convex and concave portions.

A reduction in spacing is necessary for accomplishing an increase in recording density. However, there is a possibility that the convex-concave shape of the recording layer may impede the stable flying characteristic of a magnetic head and thus cause a problem of head crash or the like. From this point of view, JP-A-H10-222944 discloses a recording medium in which the convex-concave shape changes in a track width direction for the purpose of achieving the flying stability of a magnetic head.

Further, JP-A-2000-195042 proposes a discrete type magnetic recording medium in which concave portions in the convex-concave shape are filled with a nonmagnetic material or another material for ensuring the stability in flying characteristic of a magnetic head.

On the other hand, JP-A-H06-111502 discloses a technique that defines a relationship among the width of each of rectangular tracking servo burst patterns formed by a convex-concave structure on a longitudinal recording medium, the track pitch, and the read width of a reproducing head.

In general, on a magnetic recording medium used in a magnetic disk drive, servo areas necessary for a magnetic head to perform tracking are recorded by a servo track writer.

The servo area generally includes an ISG (Initial Signal Gain) portion, an SVAM (SerVo Address Mark) portion, a Gray code portion, a burst portion, and a pad portion which are in the form of various magnetic patterns for exhibiting predetermined functions, respectively.

The magnetic patterns of the burst portion are each recorded with a width equal to that of one track in a radial direction of the magnetic recording medium. On the other hand, the ISG portion, the SVAM portion, the Gray portion, and the pad portion are each recorded continuously in the disk radial direction over several tracks or entirely.

The recent increase in recording density of magnetic recording apparatuses has been remarkable and, following it, the sizes of recording bits recorded on magnetic recording mediums have been reduced. Consequently, a reduction in size of magnetic grains is also required for ensuring high S/N ratios. In this regard, it is said that, in connection with the longitudinal magnetic mediums which have been widely used, when a value of KuV/kT, i.e. a ratio between a magnetic grain magnetization energy KuV (Ku: magnetic anisotropy constant, V: magnetic grain volume) and an ambient temperature thermal energy kT (k: Boltzmann's constant, T: absolute temperature), becomes smaller than about 60 as a general standard, the so-called phenomenon of thermal fluctuation occurs wherein the magnetization fluctuates with certain probability due to disturbance of the thermal energy and decreases with the passage of time.

In view of this, in order to increase the magnetization energy of the magnetic grains, attention has been paid to the perpendicular magnetic recording mediums that can increase the thickness thereof even at high density.

The perpendicular magnetic recording medium becomes more stable in its magnetization and thus becomes stronger against the thermal fluctuation as the density increases, while, since a demagnetizing field serving to reduce the magnitude of the magnetization increases at low recording density, i.e. in an area where the bit length is large, the influence of the thermal fluctuation tends to be accelerated to reduce the recording magnetization.

Therefore, the area that is most affected by the thermal fluctuation is the servo area where servo signals are recorded at relatively low recording density.

Once recorded, the servo signal is normally not recorded again by the magnetic head, and therefore, it is susceptible to the influence of thermal fluctuation over the long term so that there may arise a problem that the servo signal is degraded due to a reduction in recording magnetization, resulting in reduction of the tracking servo signal quality.

In view of such a problem, JP-A-H11-25402 discloses a technique wherein, in recording magnetization of tracking servo signals in a perpendicular magnetic recording medium having no convex-concave structure, the bit lengths of the servo signals are set such that a maximum demagnetization field at the time of magnetization saturation in recording bits becomes smaller than a coercive force of a recording layer, and wherein relational expressions for the setting are derived.

In this proposed technique, the servo signals are continuously arranged while perpendicular magnetizations M of rectangular bits are alternately inverted as shown in figures of this publication, and therefore, a demagnetizing field Hd generated at a certain bit is reduced in its demagnetizing field due to magnetic fields H from the most adjacent bits. Particularly, the demagnetizing field theoretically becomes zero in a boundary between the bits and it is thus considered that the value approximate to the saturation magnetization is ensured in the vicinity of ideal magnetization transition.

However, as shown in JP-A-H06-111502, in case of the discrete track disk having the convex-concave structure, rectangular recording bits are normally arranged at intervals of one bit in a burst portion having the convex-concave shape formed by magnetic recording layers corresponding to the servo patterns. Further, rectangular bits each elongate in the disk radial direction are arranged at intervals of one bit in an ISG portion, an SVAM portion, and a Gray code portion.

In the discrete track disk having the magnetic recording layers formed into the convex-concave structure as described above, as is different from the system in which the inverted magnetizations are continuously recorded on the perpendicular magnetic medium as described in JP-A-H11-25402, the convex-portion magnetic recording layers where servo signals are recorded are completely isolated from each other so that there exist no such most adjacent bits that are inversely magnetized and serve to weaken a demagnetizing field. Further, those bits distanced from each other by one bit length are magnetized in the same direction so that the effect of reducing the demagnetizing field is hardly expected and they rather serve to increase the demagnetizing field.

Further, in the discrete track disk, the demagnetizing field does not become zero even at end surfaces of the rectangular bits and the boundary where the demagnetizing field would otherwise become free in magnetization transition between the bits is subjected to the influence of the demagnetizing field. Therefore, the influence of the thermal fluctuation in the servo area is larger as compared with the case where the conventional perpendicular magnetic recording medium with no convex-concave structure is used, and therefore, the reliability of the servo signals over the long term cannot be said to be sufficient.

The present invention has been made under these circumstances and has an object to provide a magnetic recording and reproducing apparatus including a perpendicular magnetic recording medium in the form of a discrete track disk having a convex-concave structure, wherein the magnetic recording medium can suppress degradation of a servo signal caused by thermal fluctuation of magnetization of perpendicular magnetic recording layers forming a convex-concave structure in a serve area to thereby ensure a stable servo function over the long term.

SUMMARY OF THE INVENTION

For accomplishing the foregoing object, a magnetic recording and reproducing apparatus of the present invention comprises a perpendicular magnetic recording medium of a discrete type having a data information recording portion and a servo information portion for tracking, wherein a convex structure, where a servo signal is recorded, of the perpendicular magnetic recording medium is set to a truncated quadrangular pyramid shape and a specification (shape and magnetic property) of the truncated quadrangular pyramid shape and so forth are determined according to the properties of the perpendicular magnetic recording medium to be used, so that the influence of a demagnetizing field that accelerates thermal fluctuation of the perpendicular magnetic recording medium can be reduced in a servo area of the medium which is most affected by the thermal fluctuation of the medium.

Specifically, according to one aspect of the present invention, there is obtained a magnetic recording and reproducing apparatus comprising a magnetic recording medium having a data information recording portion and a servo information portion for tracking, and a magnetic head for detecting servo information of the servo information portion and recording and reproducing data information on and from the data information recording portion, wherein the servo information portion is composed of perpendicular magnetic recording layers formed by convex portions based on a predetermined convex-concave pattern, the servo information portion comprising a burst portion where burst signals for tracking are recorded, the burst portion is formed by disposing at predetermined positions the perpendicular magnetic recording layers in the form of the convex portions where the burst signals are recorded, the perpendicular magnetic recording layer in the form of the convex portion has a first and a second substantially trapezoidal shape in a track width direction (track radial direction) and in a track circumferential direction, respectively, and when an upper side corresponding to an upper surface of the perpendicular magnetic recording layer in the form of the convex portion is given as W1 and a lower side corresponding to a lower surface of the perpendicular magnetic recording layer in the form of the convex portion is given as W2 in the first trapezoidal shape in the track width direction, an upper side corresponding to the upper surface of the perpendicular magnetic recording layer in the form of the convex portion is given as L1 and a lower side corresponding to the lower surface of the perpendicular magnetic recording layer in the form of the convex portion is given as L2 in the second trapezoidal shape in the track circumferential direction, a thickness of the perpendicular magnetic recording layer in the form of the convex portion is given as t (equal to a height from W2 being the lower side of the convex magnetic recording layer to W1 being the upper side thereof, and equal to a height from L2 to L1), and a coercive force, a saturation magnetization, and a coercive force squareness ratio in a direction perpendicular to the film plane of the perpendicular magnetic recording layer in the form of the convex portion are given as Hc, Ms, and S*, respectively, a specification of the burst portion is set so that the coercive force squareness ratio S* takes a value of 0.8 or more and a relationship of a first inequality is satisfied, the first inequality given as $$Hc \cdot S^* > 4Ms \left( \arctan \frac{L1 \; W1}{t\sqrt{L1^2 + W1^2 + t^2}} + \arctan \frac{L2 \; W2}{t\sqrt{L2^2 + W2^2 + t^2}} \right)$$

In the magnetic recording and reproducing apparatus of the present invention, it may be arranged that when a coercive force, a residual magnetization, and a coercive force squareness ratio in the direction perpendicular to the film plane of the perpendicular magnetic recording layer in the form of the convex portion are given as Hc, Mr, and S*, respectively, the specification of the burst portion is set so that the coercive force squareness ratio S* takes the value of 0.8 or more and a relationship of a second inequality is satisfied, the second inequality given as $$Hc \cdot S^* > 4Mr \left( \arctan \frac{L1 \cdot W1}{t\sqrt{L1^2 + W1^2 + t^2}} + \arctan \frac{L2 \cdot W2}{t\sqrt{L2^2 + W2^2 + t^2}} \right)$$

In the magnetic recording and reproducing apparatus of the present invention, it may be arranged that a relationship of W2>W1 and L2>L1 is satisfied.

In the magnetic recording and reproducing apparatus of the present invention, it may be arranged that when an interval between the adjacent perpendicular magnetic recording layers each in the form of the convex portion in the track circumferential direction is given as L3, the sum of L2 and L3 is set as a wavelength of frequency of a servo signal.

According to another aspect of the present invention, there is obtained a magnetic recording and reproducing apparatus comprising a magnetic recording medium having a data information recording portion and a servo information portion for tracking, and a magnetic head for detecting servo information of the servo information portion and recording and reproducing data information on and from the data information recording portion, wherein the servo information portion is composed of perpendicular magnetic recording layers formed by convex portions based on a predetermined convex-concave pattern, the servo information portion is formed by disposing at predetermined positions the perpendicular magnetic recording layers in the form of the convex portions where servo signals are recorded, the perpendicular magnetic recording layers in the form of the convex portions including belt-like convex portions each extending in a track radial direction (track width direction), the belt-like convex portion has a trapezoidal shape with its upper side given as L1 and its lower side given as L2 in a track circumferential direction and has a length 100 times or more a length of L2 in the track radial direction, and when a thickness of the perpendicular magnetic recording layer in the form of the belt-like convex portion is given as t (equal to a height from L2 being the lower side of the convex magnetic recording layer to L1 being the upper side thereof), and a coercive force, a saturation magnetization, and a coercive force squareness ratio in a direction perpendicular to the film plane of the perpendicular magnetic recording layer in the form of the belt-like convex portion are given as Hc, Ms, and S*, respectively, a specification of the belt-like convex portion is set so that the coercive force squareness ratio S* takes a value of 0.8 or more and a relationship of a third inequality is satisfied, the third inequality given as $$Hc \cdot S^* > 4Ms \left( \arctan \frac{L1}{t} + \arctan \frac{L2}{t} \right)$$

In the magnetic recording and reproducing apparatus of the present invention, it may be arranged that when a coercive force, a residual magnetization, and a coercive force squareness ratio in the direction perpendicular to the film plane of the perpendicular magnetic recording layer in the form of the belt-like convex portion are given as Hc, Mr, and S*, respectively, the specification of the belt-like convex portion is set so that the coercive force squareness ratio S* takes the value of 0.8 or more and a relationship of a fourth inequality is satisfied, the fourth inequality given as $$Hc \cdot S^* > 4Mr \left( \arctan \frac{L1}{t} + \arctan \frac{L2}{t} \right)$$

In the magnetic recording and reproducing apparatus of the present invention, it may be arranged that recording of servo signals in the servo information portion is carried out at a time by applying a magnetic field perpendicular to the plane of the perpendicular magnetic recording layers of the magnetic recording medium in a DC magnetic field.

In the magnetic recording and reproducing apparatus of the present invention, it may be arranged that the servo information portion is formed into the predetermined convex-concave pattern and a nonmagnetic material for providing a discrete function is filled in concave portions.

DETAILED DESCRIPTION OF THE INVENTION

Hereinbelow, the best mode for carrying out the present invention will be described in detail.

A magnetic recording and reproducing apparatus of the present invention comprises a magnetic recording medium having data information recording portions and servo information portions for tracking, and a magnetic head for detecting servo information of the servo information portions and recording and reproducing data information on and from the data information recording portions.

At the outset, an example of a schematic structure of the magnetic recording and reproducing apparatus will be described with reference to FIG. 6 in order to understand the overall structure of the apparatus.

Figure 6:
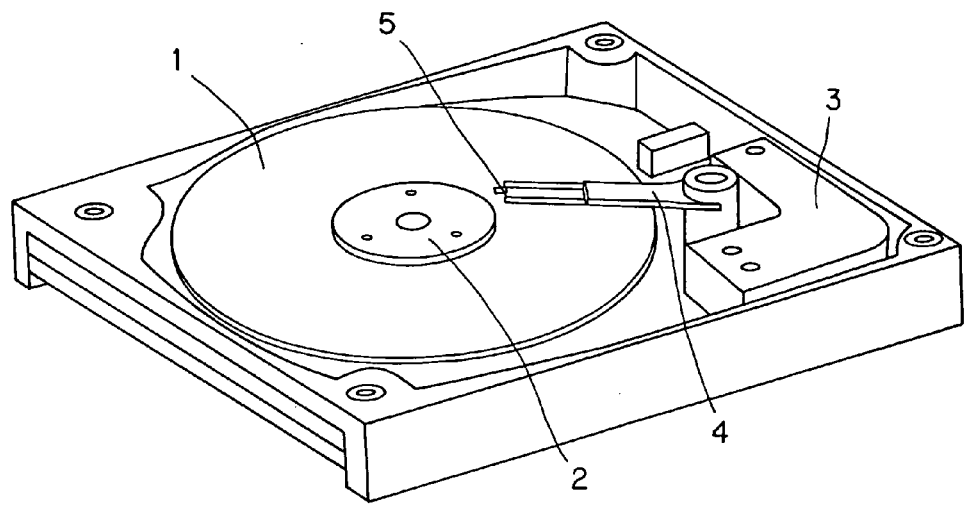
FIG. 6 is a schematic perspective view of a magnetic recording and reproducing apparatus.

Description of Example of Schematic Structure of Magnetic Recording and Reproducing Apparatus FIG. 6 is a perspective view showing a schematic structure of the magnetic recording and reproducing apparatus being one preferred example of the present invention.

In this figure, a magnetic recording medium 1 is a disk-shaped perpendicular magnetic recording medium and is rotationally driven by a spindle motor 2.

Further, in order to read and write data relative to the magnetic recording medium, a recording and reproducing magnetic head 5 is provided at the tip of a swing arm 4 extending radially inward toward the center of the medium from its outer peripheral side. The swing arm 4 is swung by a voice coil motor 3 so that, for example, the magnetic head 5 can be positioned at a given track based on servo signals detected by the magnetic head 5.

The magnetic head 5 has a recording element and a reproducing element. A single-pole head of a main-pole excitation type, for example, is used as the recording element, while, a GMR (Giant MagnetoResistance effect) head, for example, is used as the reproducing element. A TMR (Tunneling MagnetoResistance effect) head or the like may be used instead of the GMR head.

Description of Magnetic Recording Medium

Now, the structure of the magnetic recording medium will be described.

Figure 1:
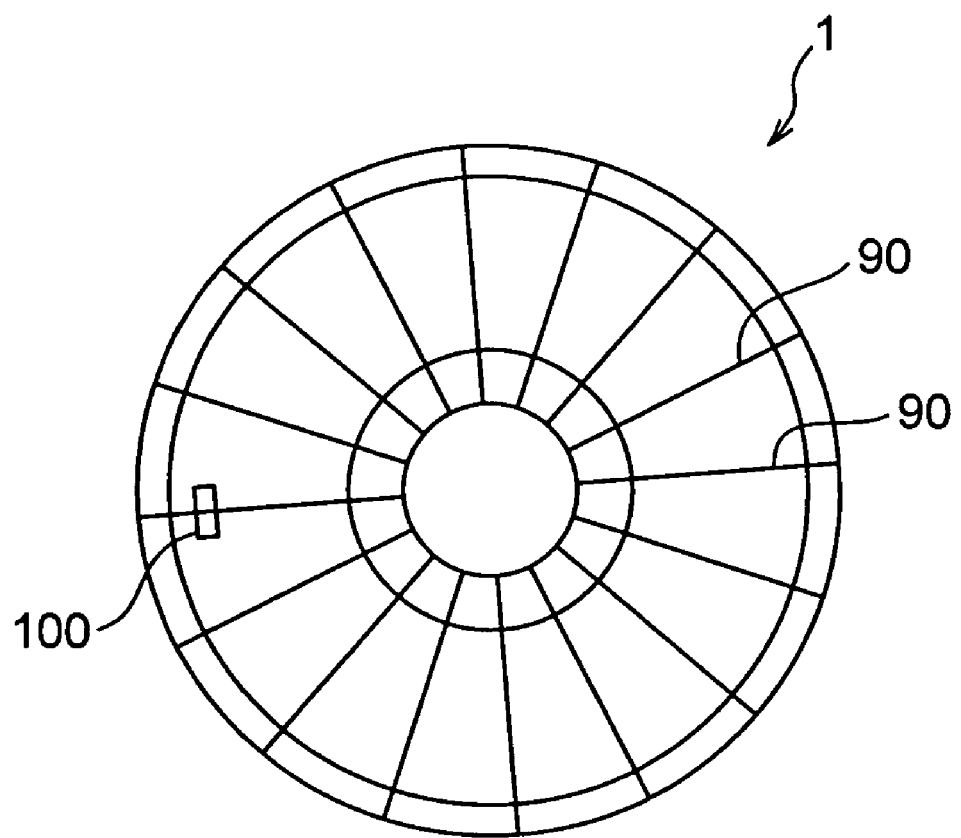
FIG. 1 is a schematic plan view showing an overall shape of a disk-shaped magnetic recording medium of the present invention.
Figure 2:
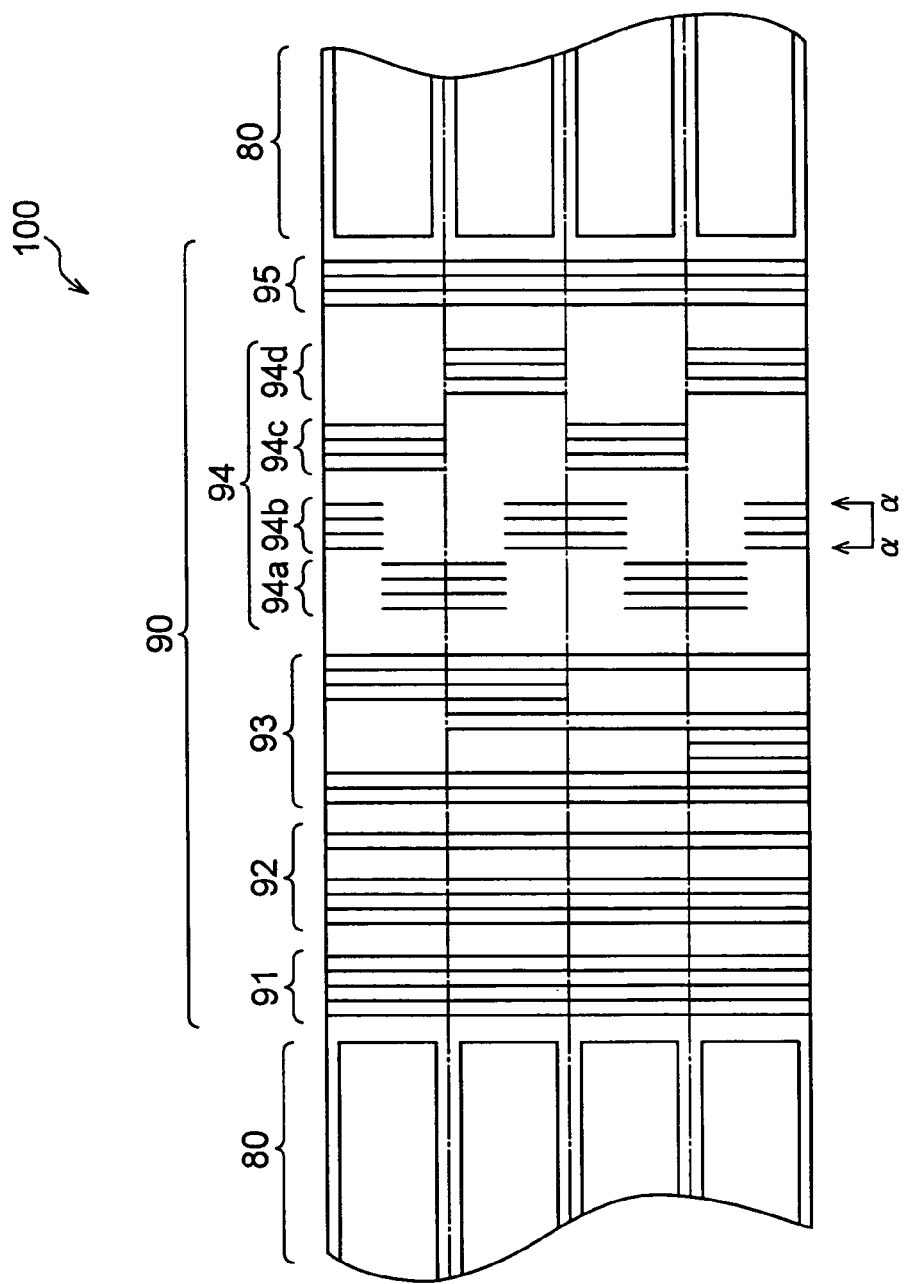
FIG. 2 is an enlarged schematic view of a small portion surrounded by a rectangle in FIG. 1.

FIG. 1 is a schematic plan view showing the overall shape of the disk-shaped magnetic recording medium 1 used in the present invention, and FIG. 2 is an enlarged schematic view of a small portion 100 surrounded by a rectangle in FIG. 1. FIG. 2 conceptually illustrates mainly a servo information portion 90 being an area where servo signals are recorded, and data information recording portions 80 each in the form of a group of data tracks for recording and reproduction.

Figure 3:
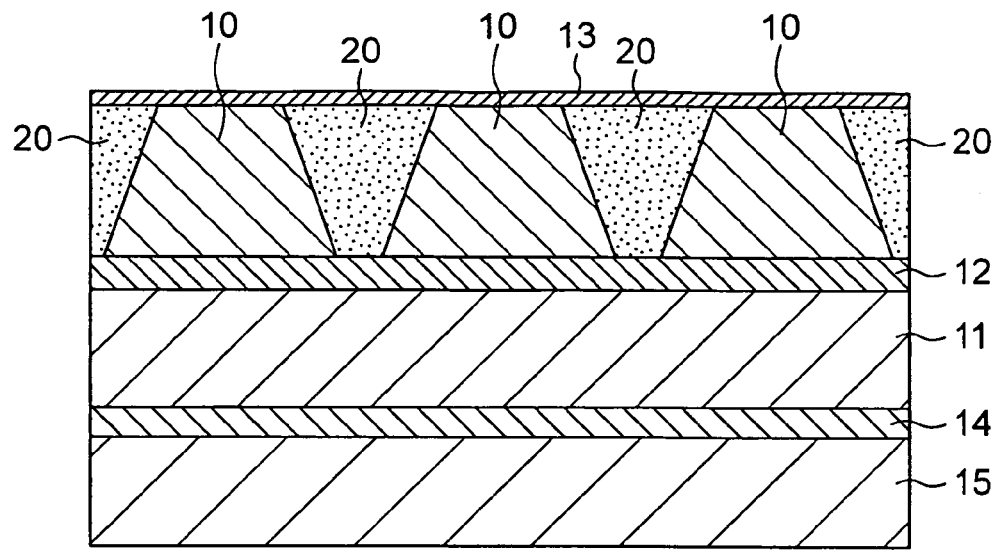
FIG. 3 is a sectional view conceptually showing a preferred embodiment of the magnetic recording medium of the present invention.

FIG. 3 is a sectional view conceptually illustrating a preferred embodiment of the magnetic recording medium in the present invention. FIG. 3 substantially corresponds to a sectional view taken along line α—α in FIG. 2.

In FIG. 1, although not illustrated, a plurality of data track groups for recording and reproduction are concentrically disposed/formed on a disk substrate.

Further, servo signal regions (servo information portions 90: those portions drawn as radial lines in FIG. 1) are radially formed extending outward from the center of the disk. That is, a so-called sector servo system is employed wherein the disk surface is divided into sectors. Servo information is recorded in each of the servo information portions 90 of the magnetic recording medium.

The structure of the servo information portion 90 will be described in detail. As shown in FIG. 2, the servo information portion 90 (so-called servo area) comprises an ISG (Initial Signal Gain) portion 91, an SVAM (SerVo Address Mark) portion 92, a Gray code portion 93, a burst portion 94, and a pad portion 95.

The ISG portion 91 is in the form of a continuous pattern provided for excluding influences of unevenness in magnetic property of a magnetic film (magnetic layer) of the magnetic recording medium and in flying amount of the magnetic head and is continuously formed in the track radial direction. While reproducing the ISG portion 91 by the magnetic head, the gain of a servo demodulation circuit is determined by an automatic gain control (AGC) so as to correct variation in output caused by the magnetic recording medium or the magnetic head. The automatic gain control (AGC) that performs such an operation is turned off when the SVAM portion 92 existing in the servo area is detected, and standardizes the reproduction amplitude existing in the later burst portion 94 by the amplitude of the ISG portion 91.

The Gray code portion 93 is recorded with information about respective track numbers and a sector number.

The burst portion 94 is in the form of patterns for providing precise position information necessary for the magnetic head to perform accurate tracking to the track position. These patterns are normally composed of a combination of first bursts 94a and second bursts 94b each equally straddling a center line that defines the track pitch between the adjacent tracks and a combination of third bursts 94c and fourth bursts 94d each located at a position offset from the first and second bursts by half the track pitch. As shown in FIG. 2, the patterns of the burst portion 94 are each normally recorded with a width equal to that of one track in a radial direction of the magnetic recording medium.

The pad portion 95 is in the form of a pattern provided for absorbing a delay of a demodulation circuit system so that clock generation can be maintained while the servo demodulation circuit reproduces the servo area.

The ISG portion 91, the SVAM portion 92, and the pad portion 95 are each recorded continuously in the disk radial direction, while, the Gray code portion 93 is recorded over several tracks or more in the disk radial direction.

Referring now to FIG. 3, description will be given about an example of a preferred section structure of the magnetic recording medium. FIG. 3 can be understood as, for example, the sectional view taken along line α—α in FIG. 2.

As shown in FIG. 3, the magnetic recording medium comprises a substrate 15, an orientation layer 14 formed on the substrate 15, a soft magnetic layer 11 formed on the orientation layer 14, an intermediate layer 12 formed on the soft magnetic layer 11, perpendicular magnetic recording layers 10 and nonmagnetic layers 20 corresponding to convex portions and concave portions, respectively, of the convex-concave shape formed on the intermediate layer 12, and a protective layer 13 formed on the layers 10 and 20.

As the substrate 15, use is preferably made of a glass substrate, an NiP-coated aluminum alloy substrate, an Si substrate, or the like. As the orientation layer 14, use can be made of, for example, an antiferromagnetic material such as PtMn for applying an anisotropic magnetic field to the soft magnetic layer 11 in the track width direction. Alternatively, use may be made of a nonmagnetic alloy for controlling the orientation.

As the soft magnetic layer 11, there can be cited a CoZrNb alloy, an Fe-based alloy, a Co-based amorphous alloy, a soft magnetic/nonmagnetic multilayer film, soft magnetic ferrite, or the like.

The intermediate layer 12 is provided for controlling a perpendicular magnetic anisotropy and a crystal grain size of the perpendicular magnetic recording layers 10 formed on the intermediate layer 12, and a CoTi nonmagnetic alloy, for example, is used therefor. Alternatively, use may be made of a nonmagnetic metal, an alloy, or a low-permeability alloy that works similarly.

As the convex-portion perpendicular magnetic recording layer 10, use is preferably made of a medium in which ferromagnetic grains of CoPt or the like are contained in a matrix in an $SiO_2$ oxide-based material, a CoCr-based alloy, an FePt alloy, a Co/Pd-based artificial lattice type multilayer alloy, or the like.

As a material of the concave-portion nonmagnetic layer 20, use is made of a nonmagnetic oxide such as $SiO_2$, $Al_2O_3$, $TiO_2$, or ferrite, a nitride such as AlN, or a carbide such as SiC.

Normally, the protective layer 13 in the form of a carbon thin film or the like is formed on the surfaces of the convex-portion perpendicular magnetic recording layers 10 and the nonmagnetic layers 20 filled in the concave portions by the use of the CVD method or the like.

The formation of the perpendicular magnetic recording layers 10 and the nonmagnetic layers 20 based on the convex-concave pattern (the formation of the so-called discrete type medium) is carried out by, for example, etching a perpendicular magnetic recording layer, formed in a constant thickness, into a predetermined convex-concave shape, then sputtering SiO$_2$ corresponding to an etching depth to fill etched concave portions. Thereafter, SiO$_2$ excessively deposited on the perpendicular magnetic recording layer is removed by applying oblique ion-beam etching or the like while rotating the medium, thereby flattening the whole surface of the medium.

Setting of Specification of Servo Area (Servo Information Portion)

The main part of the present invention resides in that, for the purpose of suppressing degradation of a servo signal to thereby ensure a stable servo function over the long term in a servo area (servo information portion) of a perpendicular magnetic recording medium which is most affected by thermal fluctuation of the medium, the convex structure where the servo signal is recorded is set to a truncated quadrangular pyramid shape and a specification (shape and magnetic property) of the truncated quadrangular pyramid shape and so forth are determined according to the properties of the perpendicular magnetic recording medium to be used.

Hereinbelow, with respect to the magnetic recording layers (magnetic layers) having the convex structures for the respective functions in the servo area, description will be separately given about (1) the burst portion 94 (94a to 94d) forming a first group that requires consideration of lengths in both the track radial direction (disk radial direction) and the track circumferential direction and (2) the ISG portion 91, the SVAM portion 92, the Gray code portion 93, and the pad portion 95 forming a second group that requires consideration of lengths only in the track circumferential direction because lengths in the track radial direction (disk radial direction) are extremely longer than the lengths in the track circumferential direction.

(1) Description of First Group

The convex shape satisfying a required condition of the first group corresponds to the shape of the burst portion 94 as described before. As shown in a schematic perspective view of FIG. 4, the burst portion 94 is formed by disposing at predetermined positions the perpendicular magnetic recording layers 10 in the form of convex portions where magnetizations of burst signals are recorded in the same direction, and each perpendicular magnetic recording layer 10 in the form of the convex portion has a first and a second substantially trapezoidal shape in the track width direction and in the track circumferential direction, respectively (truncated quadrangular pyramid shape). Incidentally, illustration of the nonmagnetic layers filled in the concave portions is omitted in the figure for better understanding of the shape of the perpendicular magnetic recording layer 10 in the form of the convex portion.

Figure 4:
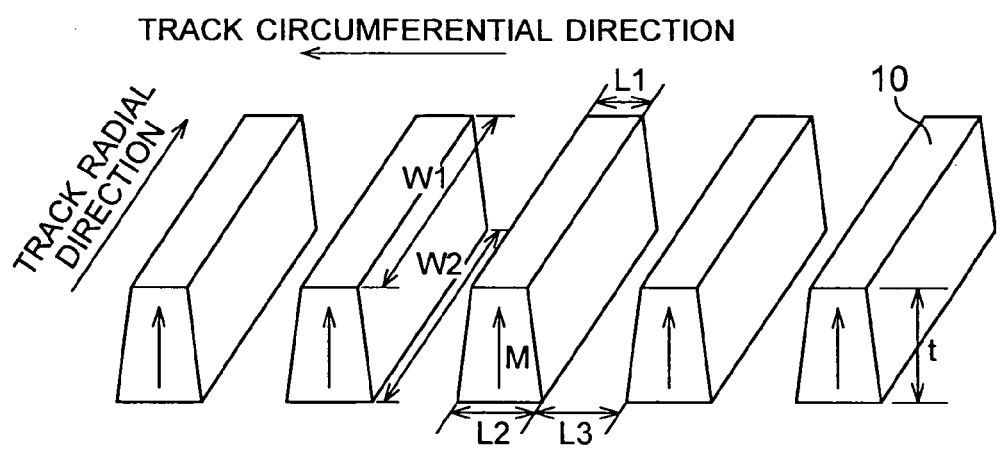
FIG. 4 is a schematic perspective view showing a structure of perpendicular magnetic recording layers each having a truncated quadrangular pyramid shape.
Figure 7:
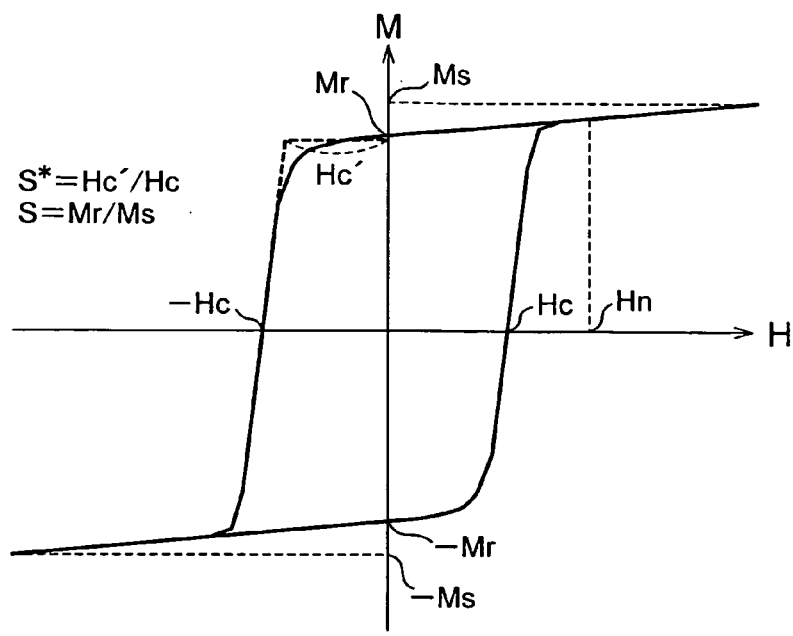
FIG. 7 is a diagram showing a magnetization-magnetic field curve of the magnetic recording medium.

When an upper side corresponding to the surface (upper surface) of the perpendicular magnetic recording layer 10 in the form of the convex portion is given as W1 and a lower side corresponding to the lower surface of the perpendicular magnetic recording layer 10 in the form of the convex portion is given as W2 (W2>W1) in the first trapezoidal shape in the track width direction which can be seen in a lateral direction in FIG. 4, an upper side corresponding to the surface (upper surface) of the perpendicular magnetic recording layer 10 in the form of the convex portion is given as L1 and a lower side corresponding to the lower surface of the perpendicular magnetic recording layer 10 in the form of the convex portion is given as L2 (L2>L1) in the second trapezoidal shape in the track circumferential direction which can be seen at the front in FIG. 4, the thickness of the perpendicular magnetic recording layer 10 in the form of the convex portion is given as t (equal to a height from W2 being the lower side of the convex magnetic recording layer to W1 being the upper side thereof, and equal to a height from L2 to L1), the magnetic properties of the perpendicular magnetic recording layer 10 in the form of the convex portion are assumed to exhibit an M (magnetization)-H (magnetic field) characteristic as shown in FIG. 7, and a coercive force, a saturation magnetization, and a coercive force squareness ratio in a direction perpendicular to the film plane of the perpendicular magnetic recording layer in the form of the convex portion are given as Hc, Ms, and S*, respectively, it is necessary to determine a configuration of the convex portion and set magnet properties of the perpendicular magnetic recording layer so that the coercive force squareness ratio S* takes a value of 0.8 or more and a relationship of an inequality (1) below is satisfied, thereby determining a specification of the burst portion. For the respective parameters, units shown in tables of later-described examples are used.

The coercive force squareness ratio S* is a value determined by the slope of a tangent line at a point −Hc of the M-H curve shown in FIG. 7 which has been corrected by a demagnetizing field, and a value of Mr, and is defined as S*=Hc'/Hc. Hc' represents a value of the coercive force at a point of intersection between the tangent line at the point −Hc of the M-H curve and a straight line of M=Mr in the second quadrant as shown in FIG. 7. Note that "corrected by a demagnetizing field" represents that an applied magnetic field is corrected, with respect to a value of magnetization caused by the applied magnetic field, by the use of a demagnetizing field generated by the product of the magnetization and a demagnetizing field coefficient in the direction perpendicular to the perpendicular magnetic recording layer, thereby deriving the M-H curve.

$$Hc \cdot S^* > 4Ms \left( \arctan \frac{L1 \ W1}{t\sqrt{L1^2 + W1^2 + t^2}} + \arctan \frac{L2 \ W2}{t\sqrt{L2^2 + W2^2 + t^2}} \right) \quad (1)$$

The expression on the right side of the inequality (1) represents the magnitude of a demagnetizing field when a saturation magnetization Ms is recorded at the convex portion of the truncated quadrangular pyramid shape (trapezoidal convex portion) shown in FIG. 4. It has been found that, by setting a value Hc' (=Hc·S*), i.e. the product of a coercive force Hc and a coercive force squareness ratio S*, to be greater than a numerical value of the demagnetizing field serving to reduce the recorded magnetization, it is possible to suppress inversion of the magnetization recorded at the convex portion to thereby suppress degradation of a servo signal so that the long-term stability can be achieved. In this event, as described before, it is necessary that the value of the coercive force squareness ratio S* be set to 0.8 or more (preferably 0.85 to 1.0, and more preferably 0.9 to 1.0). When the value of the coercive force squareness ratio S* becomes less than 0.8, the squareness ratio of the M-H curve is decreased, and therefore, there arises a disadvantage that while the demagnetizing field is being applied to the magnetization in the perpendicular magnetic recording layer, the magnetization can be more easily inverted due to an external magnetic field and thermal fluctuation of the magnetization. In case of the discrete pattern in the so-called discrete medium, the influence of the demagnetizing field becomes, extremely large as compared with the conventional continuous medium.

The magnitudes of the coercive force Hc and the coercive force squareness ratio S* can be changed by selection of a composition of the magnetic recording layer, a layer structure, an underlayer, a film formation technique, or the like.

Further, by forming the convex portion into the truncated quadrangular pyramid shape, the demagnetizing field can be reduced as compared with the conventional rectangular-type convex-concave structure, and therefore, it becomes easy to realize the setting specification that can more manifest the effect of the present invention. Therefore, the effect for extremely high magnetization stability can be manifested by carrying out the setting so as to form the convex portion into the truncated quadrangular pyramid shape and satisfy the dimensions and magnetic properties of the convex portion according to the foregoing relational expression (1).

Herein, the length of L2 is set to a bit length corresponding to a frequency of the burst patterns, and L1 is set smaller than L2. Normally, W1 corresponds to the track width of the perpendicular magnetic recording medium. By setting the section shapes of the convex portion in the track width direction and in the track circumferential direction to the trapezoidal shapes, respectively, it is possible to more reduce the demagnetizing field as compared with the conventional rectangular-type convex-concave structure. This is because, since the area of the perpendicular magnetic recording layer surface corresponding to the upper sides is reduced, the demagnetizing field decreases following it. In the trapezoidal shape in the present invention, a base angle θ is set in the range of 55° to 85°, preferably 65° to 80°. Incidentally, in case of the rectangular shape, a base angle θ is 90°.

When deriving the foregoing inequality (1) using the geometric model of the trapezoidal convex shape shown in FIG. 4, the following points were considered.

Specifically, in case of the discrete medium, the adjacent bits are isolated from each other as different from the continuous medium, and therefore, the value of the demagnetizing field Hd was derived with respect to a demagnetizing field in one specific pattern. In order to derive the representative magnitude, the demagnetizing field was derived by superimposing, at the center of the truncated quadrangular pyramid shaped structure, magnetic fields generated from magnetic charges induced by a perpendicular magnetization M at the upper and lower surfaces of the pattern.

Further, when a residual magnetization of the convex-portion perpendicular magnetic recording layer 10 is given as Mr, it is necessary to determine a configuration of the convex portion and set magnet properties of the perpendicular magnetic recording layer so that a relationship of an inequality (2) below is satisfied, thereby determining a specification of the burst portion with respect to the truncated quadrangular pyramid shape which is the same as that in the inequality (1). For the respective parameters, the units shown in the tables of the later-described examples are used.

The points considered when deriving the inequality (2) are the same as those in case of the inequality (1).

$$Hc \cdot S^* > 4Mr\left(\arctan\frac{L1\ W1}{t\sqrt{L1^2+W1^2+t^2}} + \arctan\frac{L2\ W2}{t\sqrt{L2^2+W2^2+t^2}}\right) \quad (2)$$

The expression on the right side of the inequality (2) represents the magnitude of a demagnetizing field in the state where saturation recording is carried out and the magnetization becomes a residual magnetization Mr at the convex portion of the truncated quadrangular pyramid shape shown in FIG. 4. It has been found that, by setting a value Hc' (=Hc·S*), i.e. the product of a coercive force Hc and a coercive force squareness ratio S*, to be greater than a numerical value of the demagnetizing field serving to reduce the recorded magnetization, it is possible to suppress inversion of the magnetization recorded at the convex portion to thereby suppress degradation of a servo signal caused by a reduction in recording magnetization so that the long-term stability can be achieved. In this event, as described before, it is necessary that the value of the coercive force squareness ratio S* be set to 0.8 or more (preferably 0.85 to 1.0, and more preferably 0.9 to 1.0). When the value of the coercive force squareness ratio S* becomes less than 0.8, the squareness ratio of the M-H curve is decreased, and therefore, there arises a disadvantage that while the demagnetizing field is being applied to the magnetization in the perpendicular magnetic recording layer, the magnetization can be more easily inverted due to an external magnetic field and thermal fluctuation of the magnetization. In case of the discrete pattern in the so-called discrete medium, the influence of the demagnetizing field becomes extremely large as compared with the conventional continuous medium.

The magnitudes of the coercive force Hc and the coercive force squareness ratio S* can be changed by selection of a composition of the magnetic recording layer, a layer structure, an underlayer, a film formation technique, or the like.

When the value of the coercive force squareness ratio S* and the inequality (2) are satisfied, although a lower limit value of the magnetization stability becomes smaller as compared with the case of the saturation magnetization Ms, the coercive force of the medium exceeds the demagnetizing field caused by the residual magnetization to thereby suppress age-based reduction in magnetization caused by thermal fluctuation and the resistance against an external magnetic field increases so that the long-term stability is ensured.

On the other hand, when an interval between the adjacent perpendicular magnetic recording layers 10 each having the truncated quadrangular pyramid shape is given as L3 as shown in FIG. 4, the length of the sum of L2 and L3 is equal to a wavelength of the servo signal recorded herein. L2 and L3 are generally equal to each other, but a relationship in magnitude therebetween may be changed depending on the process of signal waveform processing. That is, since the length of the sum of L2 and L3 forms one wavelength, it is possible to desirably change one bit length depending on the setting of L2 and L3.

Figure 8:
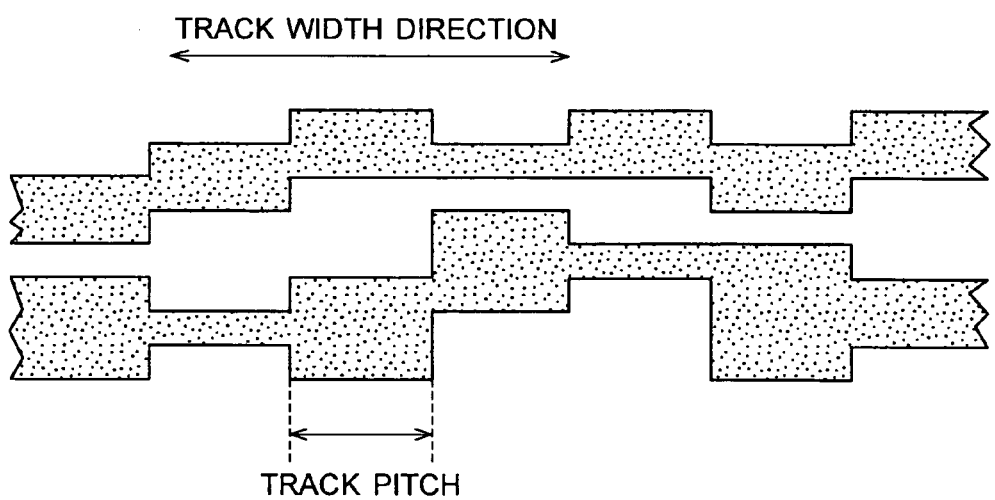
FIG. 8 is a plan view for explaining one example of another servo pattern.

In the Gray code area, so-called servo patterns may take various shapes corresponding to sector address numbers (formed by various "0"/"1" patterns) as shown, for example, in a plan view of FIG. 8. That is, the shapes are not limited to the two kinds as described above, i.e. the approximately rectangular shape (for example, as shown in FIG. 4) and the belt shape. In case of the pattern shown in FIG. 8, it can be basically disintegrated into rectangular patterns when seeing the individual area points, and the present invention may be applied to the disintegrated patterns.

(2) Description of Second Group

Figure 5:
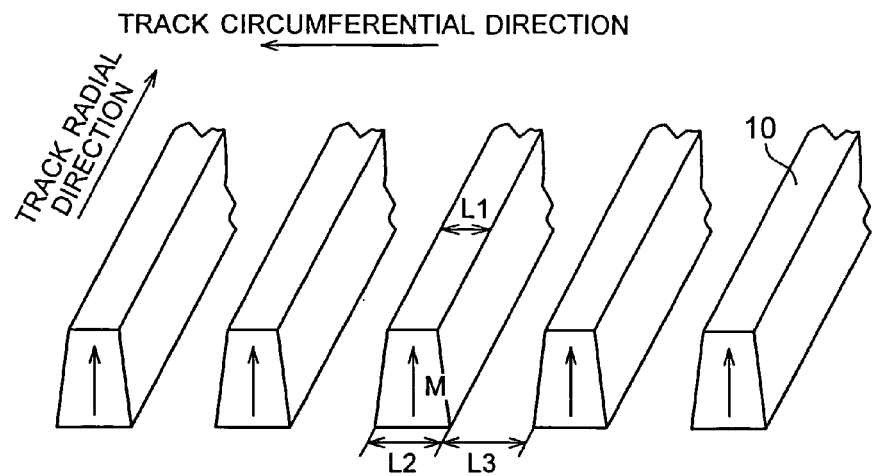
FIG. 5 is a schematic perspective view showing a structure of perpendicular magnetic recording layers each having a truncated quadrangular pyramid shape.

The convex shape of the perpendicular magnetic recording layer 10 in the form of the convex portion that satisfies a required condition of the second group corresponds to the shape of the ISG portion 91, the SVAM portion 92, the Gray code portion 93, and the pad portion 95 as described before. As shown in FIG. 5, each of these portions has a belt-like convex portion extending in the track radial direction. This belt-like convex portion has a trapezoidal shape with an upper side L1 and a lower side L2 in the track circumferential direction and has a length 100 times or more the length of L2 in the track radial direction as shown in the figure. When the thickness of the perpendicular magnetic recording layer 10 in the form of the belt-like convex portion is given as t (equal to a height from L2 being the lower side of the convex magnetic recording layer to L1 being the upper side thereof), and a coercive force, a saturation magnetization, and a coercive force squareness ratio in a direction perpendicular to the film plane of the perpendicular magnetic recording layer 10 in the form of the belt-like convex portion are given as Hc, Ms, and S*, respectively, it is necessary to determine a configuration of the belt-like convex portion and set magnet properties of the perpendicular magnetic recording layer so that the coercive force squareness ratio S* takes a value of 0.8 or more and a relationship of an inequality (3) below is satisfied, thereby determining a specification of the belt-like convex portion. For the respective parameters, the units shown in the tables of the later-described examples are used.

$$Hc \cdot S^* > 4Ms\left(\arctan\frac{L1}{t} + \arctan\frac{L2}{t}\right) \quad (3)$$

The expression on the right side of the inequality (3) represents the magnitude of a demagnetizing field when a saturation magnetization Ms is recorded at the belt-like convex portion of the truncated quadrangular pyramid shape (trapezoidal convex portion) shown in FIG. 5. It has been found that, by setting a value Hc' (=Hc·S*), i.e. the product of a coercive force Hc and a coercive force squareness ratio S*, to be greater than a numerical value of the demagnetizing field serving to reduce the recorded magnetization, it is possible to suppress inversion of the magnetization recorded at the belt-like convex portion to thereby suppress degradation of a servo signal so that the long-term stability can be achieved. In this event, as described before, it is necessary that the value of the coercive force squareness ratio S* be set to 0.8 or more (preferably 0.85 to 1.0, and more preferably 0.9 to 1.0). When the value of the coercive force squareness ratio S* becomes less than 0.8, the squareness ratio of the M-H curve is decreased, and therefore, there arises a disadvantage that while the demagnetizing field is being applied to the magnetization in the perpendicular magnetic recording layer, the magnetization can be more easily inverted due to an external magnetic field and thermal fluctuation of the magnetization. In case of the discrete pattern in the so-called discrete medium, the influence of the demagnetizing field becomes extremely large as compared with the conventional continuous medium.

The magnitudes of the coercive force Hc and the coercive force squareness ratio S* can be changed by selection of a composition of the magnetic recording layer, a layer structure, an underlayer, a film formation technique, or the like.

Further, by forming the belt-like convex portion into the truncated quadrangular pyramid shape, the demagnetizing field can be reduced as compared with the conventional rectangular-type convex-concave structure, and therefore, it becomes easy to realize the setting specification that can more manifest the effect of the present invention. Therefore, the effect for extremely high magnetization stability can be manifested by carrying out the setting so as to form the belt-like convex portion into the truncated quadrangular pyramid shape and satisfy the dimensions and magnetic properties of the convex portion according to the foregoing relational expression (3).

When deriving the foregoing inequality (3) using the trapezoidal convex geometric model being the belt-like convex portion shown in FIG. 5, the points considered are basically the same as those in case of deriving the foregoing inequality (1) except that values of L1/W1, t/W1, L2/W2, and t/W2 can be approximated to zero.

Further, when a residual magnetization of the convex-portion perpendicular magnetic recording layer 10 is given as Mr, it is necessary to determine a configuration of the belt-like convex portion and set magnet properties of the perpendicular magnetic recording layer so that a relationship of an inequality (4) below is satisfied, thereby determining a specification of the belt-like convex portion with respect to the truncated quadrangular pyramid shape which is the same as that in the inequality (3). For the respective parameters, the units shown in the tables of the later-described examples are used.

The points considered when deriving the inequality (4) were the same as those in case of the inequality (3).

$$Hc \cdot S^* > 4Mr\left(\arctan\frac{L1}{t} + \arctan\frac{L2}{t}\right) \quad (4)$$

The expression on the right side of the inequality (4) represents the magnitude of a demagnetizing field in the state where saturation recording is carried out and the magnetization becomes a residual magnetization Mr at the belt-like convex portion of the truncated quadrangular pyramid shape shown in FIG. 5. It has been found that, by setting a value Hc' (=Hc·S*), i.e. the product of a coercive force Hc and a coercive force squareness ratio S*, to be greater than a numerical value of the demagnetizing field serving to reduce the recorded magnetization, it is possible to suppress inversion of the magnetization recorded at the convex portion to thereby suppress degradation of a servo signal caused by a reduction in recording magnetization so that the long-term stability can be achieved. In this event, as described before, it is necessary that the value of the coercive force squareness ratio S* be set to 0.8 or more (preferably 0.85 to 1.0, and more preferably 0.9 to 1.0). When the value of the coercive force squareness ratio S* becomes less than 0.8, the squareness ratio of the M-H curve is decreased, and therefore, there arises a disadvantage that while the demagnetizing field is being applied to the magnetization in the perpendicular magnetic recording layer, the magnetization can be more easily inverted due to an external magnetic field and thermal fluctuation of the magnetization. In case of the discrete pattern in the so-called discrete medium, the influence of the demagnetizing field becomes extremely large as compared with the conventional continuous medium.

The magnitudes of the coercive force Hc and the coercive force squareness ratio S* can be changed by selection of a composition of the magnetic recording layer, a layer structure, an underlayer, a film formation technique, or the like.

When the value of the coercive force squareness ratio S* and the inequality (4) are satisfied, although a lower limit value of the magnetization stability becomes smaller as compared with the case of the saturation magnetization Ms, the coercive force of the medium exceeds the demagnetizing field caused by the residual magnetization to thereby suppress age-based reduction in magnetization caused by thermal fluctuation and the resistance against an external magnetic field increases so that the long-term stability is ensured.

On the other hand, when an interval between the adjacent perpendicular magnetic recording layers 10 each having the truncated quadrangular pyramid shape is given as L3 as shown in FIG. 5, the length of the sum of L2 and L3 is equal to a wavelength of the servo signal recorded herein. L2 and L3 are generally equal to each other, but a relationship in magnitude therebetween may be changed depending on the process of signal waveform processing. That is, since the length of the sum of L2 and L3 forms one wavelength, it is possible to desirably change one bit length depending on the setting of L2 and L3.

With respect to each of the foregoing perpendicular magnetic recording layers of the truncated quadrangular pyramid shapes, since the demagnetizing field caused by the recording magnetization is more decreased in the shape with its upper-side corners being rounded as compared with the shape with its upper-side corners not rounded, the long-term stability can be achieved even with the shape with its upper-side corners being rounded if the foregoing relational expressions are substantially satisfied.

The recording of the servo signals in the servo areas in the present invention is carried out at a time through saturation magnetization by placing the perpendicular magnetic recording medium 10 in a DC magnetic field and applying a magnetic field, having an intensity equal to or greater than an external magnetic field Hn in the magnetization-magnetic field curve shown in FIG. 7, perpendicular to the plane of the perpendicular magnetic recording layers. Therefore, the perpendicular magnetic recording layers of the data information recording portions (so-called data areas) and the tracking servo information portions (so-called servo areas) are all saturation-magnetized uniformly in a certain direction.

In the servo information portion of the discrete medium of the present invention, the demagnetizing field from the adjacent bit is small but not completely zero. Therefore, it is desirable to adopt a value Hc' (=Hc·S*), i.e. the product of a coercive force Hc and a coercive force squareness ratio S*, which is further greater than the isolated bit.

Hereinbelow, specific examples will be shown to thereby describe the present invention in more detail.

(Structure of Magnetic Recording Medium)

As shown in FIG. 1, the disk surface was divided into sectors and, for applying the sector servo system, servo areas 90 each as shown in FIG. 2 were formed. That is, an ISG portion 91, an SVAM portion 92, a Gray code portion 93, a burst portion 94, and a pad portion 95 were formed according to respective servo signal patterns.

Each of convex portions of the burst portion 94 for recording burst signals was formed as a perpendicular magnetic recording layer having a truncated quadrangular pyramid shape as shown in FIG. 4. Convex portions in the ISG portion 91, the SVAM portion 92, the Gray code portion 93, and the pad portion 95 other than the burst portion 94 were, as shown in FIG. 5, each formed as a belt-like convex-portion perpendicular magnetic recording layer having a truncated quadrangular pyramid shape elongate in the disk radial direction and were arranged at intervals of one bit.

As shown in FIG. 3, the section shape of the medium was such that a PtMn layer as an orientation layer 14 (underlayer 14) was formed to a thickness of 15 nm on a mirror-polished glass substrate 15, a soft magnetic layer 11 made of CoZrNb was formed to a thickness of 200 nm on the layer 14, and an intermediate layer 12 made of a nonmagnetic alloy CoTi was further formed to a thickness of 8 nm on the layer 11. Subsequently, a perpendicular magnetic recording layer was formed to a thickness of 15 nm on the layer 12, then etching with a predetermined pattern was carried out for forming a predetermined convex-concave shape to thereby obtain convex perpendicular magnetic recording layers 10. Then, $SiO_2$ was sputtered to fill etched concave portions. Thereafter, oblique ion-beam etching was carried out while rotating the medium filled with $SiO_2$, thereby removing excessive $SiO_2$ formed on the perpendicular magnetic recording layers 10 to flatten the surface of the medium. A protective layer 13 in the form of a carbon thin film was formed to a thickness of 4 nm on the flattened surface of the medium by the CVD method, and a Fomblin lubricant was further applied to a thickness of 1 nm onto the protective layer 13, thereby completing a medium sample. For the perpendicular magnetic recording layer, use was made of a material in which CoPt ferromagnetic grains were contained in a matrix in $SiO_2$.

The recording density of a servo signal was set to 130K·FRPI (Flux Reversal Per Inch). Therefore, the value of L2 in FIGS. 4 and 5 was set to 195 nm.

Further, the track pitch of a data area was set to 85 nm corresponding to 298.8K·TPI (Track Per inch). The length of the lower side W2 of the perpendicular magnetic recording layer of the truncated quadrangular pyramid shape corresponding to the burst pattern shown in FIG. 4 was set to 85 nm.

The perpendicular magnetic recording medium subjected to the convex-concave processing for the servo areas and data areas was, for magnetizing the convex-portion perpendicular magnetic recording layers that produce servo signal magnetic fields, placed between magnetic poles of an electromagnet where a DC magnetic field of 15 kOe (1193 kA/m) was generated so that the disk surfaces were set parallel to the magnetic pole surfaces, and then the perpendicular magnetic recording layers of the truncated quadrangular pyramid shapes in the servo areas and data areas were magnetized at a time to thereby record servo signals.

The magnetic properties of the medium were measured using a vibrating sample magnetometer (VSM). For the coercive force Hc and the coercive force squareness ratio S*, use was made of numerical values, corrected by a demagnetizing field, of a non-processed magnetic recording layer after film formation. This is because, in case of the perpendicular magnetic recording medium, a strong demagnetizing field is generated when magnetization is carried out in the direction perpendicular to the film plane of the medium, so that the magnetization M—magnetic field H curve changes due to a change in film thickness and so forth. The saturation magnetization Ms and the remanent saturation magnetization Mr were Ms=350 emu/cc (350 kA/m) and Mr=340 emu/cc (340 kA/m).

In order to examine age-based changes of the servo signals of the magnetized perpendicular magnetic recording medium, reproducing GMR heads were set on track in the burst portion, the ISG portion, the SVAM portion, and the Gray code portion to measure age-based changes in reproduction output, respectively.

The track width of each reproducing GMR head was set to 85 nm. The measurement of the age-based changes in reproduction output was started by the GMR heads immediately after the magnetization by the use of an electromagnet. Thereafter, the measurement was continuously carried out for three months to measure the changes of the reproduction outputs.

The measurement was carried out by classifying test specifications into the following four types and description thereof will be given individually.

(Test Specification 1)

In Examples, Comparative Examples, and Reference Examples shown in Table 1 below, the recording density of a servo signal was set to 130K·FRPI (Flux Reversal Per Inch) as described above. The value of L2 shown in FIGS. 4 and 5 representing the embodiment of the present invention was set to 195 nm. As described above, the track pitch of the data area was set to 85 nm corresponding to 298.8K·TPI (Track Per Inch). Further, as described above, the length of the lower side W2 of the perpendicular magnetic recording layer of the truncated quadrangular pyramid shape corresponding to the burst pattern shown in FIG. 4 was set to 85 nm.

The reproduction output changes of the GMR head were measured by changing parameters of the perpendicular magnetic recording layer of the truncated quadrangular pyramid shape corresponding to the burst pattern of the servo area in FIG. 4 and values of the coercive force Hc and the coercive force squareness ratio S* in the direction perpendicular to the film plane of the perpendicular magnetic recording layer. The values of the coercive force Hc and the coercive force squareness ratio S* were changed by mainly changing the film deposition condition of the magnetic recording layer or the underfilm condition of the magnetic recording layer.

In the reproducing output change, "x" was assigned to a reduction by 10% or more from the initial output after the lapse of three months, while "○" was assigned to a reduction by less than 10%. As an acceleration test, using the medium that exhibits KuV/kT=80 at 70° C. which is higher than an ordinary maximum keeping temperature of 60° C., the measurement was carried out under the condition of KuV/kT=70 at a keeping temperature of 80° C.

In order to make clear the effect of the relational expressions of the present invention, Table 1 simultaneously shows signs of "Hc−α" and "Hc'−α" where α represents the expression on the right side of the foregoing inequality (1), and values of the coercive force squareness ratio S*. Hc'=HcS* and α is given by an equation (5) below.

$$\alpha = 4Ms\left(\arctan\frac{L1\ W1}{t\sqrt{L1^2 + W1^2 + t^2}} + \arctan\frac{L2\ W2}{t\sqrt{L2^2 + W2^2 + t^2}}\right) \quad (5)$$

TABLE 1

| | L2 (nm) | L1 (nm) | W2 (nm) | W1 (nm) | Ms (emu/cc) | Hc (Oe) | Hc−α | Hc'−α | S* | Reproduction Output Change |
|---|---|---|---|---|---|---|---|---|---|---|
| Example 1-1 | 195 | 187 | 85 | 77 | 350 | 3845 | Positive | Positive | 1.0 | ○ |
| Example 1-2 | 195 | 187 | 85 | 77 | 350 | 4043 | Positive | Positive | 0.95 | ○ |
| Example 1-3 | 195 | 187 | 85 | 77 | 350 | 4282 | Positive | Positive | 0.90 | ○ |
| Example 1-4 | 195 | 187 | 85 | 77 | 350 | 4529 | Positive | Positive | 0.85 | ○ |
| Example 1-5 | 195 | 187 | 85 | 77 | 350 | 4813 | Positive | Positive | 0.80 | ○ |
| Comparative Example 1-1 | 195 | 187 | 85 | 77 | 350 | 3840 | 0 (Zero) | 0 (Zero) | 1.0 | x |
| Comparative Example 1-2 | 195 | 187 | 85 | 77 | 350 | 4026 | Positive | Negative | 0.95 | x |
| Comparative Example 1-3 | 195 | 187 | 85 | 77 | 350 | 4233 | Positive | Negative | 0.90 | x |
| Comparative Example 1-4 | 195 | 187 | 85 | 77 | 350 | 4482 | Positive | Negative | 0.85 | x |
| Comparative Example 1-5 | 195 | 187 | 85 | 77 | 350 | 4763 | Positive | Negative | 0.80 | x |
| Comparative Example 1-6 | 195 | 187 | 85 | 77 | 350 | 5133 | Positive | Positive | 0.75 | x |
| Comparative Example 1-7 | 195 | 187 | 85 | 77 | 350 | 5080 | Positive | Negative | 0.75 | x |

*Values of demagnetizing fields of samples (samples of trapezoidal convex portions) of Example 1-1 to Comparative Example 1-7 are all 3840(Oe).

| | L2 (nm) | L1 (nm) | W2 (nm) | W1 (nm) | Ms (emu/cc) | Hc (Oe) | Hc−α | Hc'−α | S* | Reproduction Output Change |
|---|---|---|---|---|---|---|---|---|---|---|
| Reference Example 1-1 | 195 | 195 | 85 | 85 | 350 | 3845 | Negative | Negative | 1.0 | x |
| Reference Example 1-2 | 195 | 195 | 85 | 85 | 350 | 3864 | 0 (Zero) | 0 (Zero) | 1.0 | x |
| Reference Example 1-3 | 195 | 195 | 85 | 85 | 350 | 4043 | Positive | Negative | 0.95 | x |
| Reference Example 1-4 | 195 | 195 | 85 | 85 | 350 | 4282 | Positive | Negative | 0.90 | x |
| Reference Example 1-5 | 195 | 195 | 85 | 85 | 350 | 4529 | Positive | Negative | 0.85 | x |
| Reference Example 1-6 | 195 | 195 | 85 | 85 | 350 | 4813 | Positive | Negative | 0.80 | x |

*Values of demagnetizing fields of samples (samples of rectangular convex portions) of Reference Example 1-1 to Reference Example 1-6 are all 3864(Oe).

In Table 1, in addition to Comparative Examples each using a perpendicular magnetic recording layer having the truncated quadrangular pyramid shape but not satisfying the given relational expression of the present invention, there are shown Reference Examples 1-1 to 1-6 each using a perpendicular magnetic recording layer having the conventional rectangular structure.

As seen from the results shown in Table 1, it has been confirmed that, in the perpendicular magnetic recording layer of the truncated quadrangular pyramid shape satisfying "Hc'−α>0", i.e. the relationship given by the inequality (1), and further satisfying "S*≧0.8", the demagnetization is suppressed even under the condition that is more severe than the ordinary keeping condition so that the effect of the present invention can be achieved. On the other hand, when S*=0.75, the coercive force increases while the squareness ratio (Mr/Ms) decreases, and the expected property cannot be obtained.

Further, in Table 1, the magnitude of a demagnetizing field of the rectangular pattern in each of Reference Examples 1-1 to 1-6 is, as understood from "S*=1.0" and "Hc−α=0", 3864 Oe (307 kA/m) which is larger than 3840 Oe (305.8 kA/m), i.e. the magnitude of a demagnetizing field in each of the truncated quadrangular pyramid shaped patterns in Examples. Therefore, forming the pattern into the truncated quadrangular pyramid shape is advantageous in that the magnitude of the demagnetizing field becomes smaller as compared with the rectangular shape so that the stability of the magnetization can be ensured with a smaller coercive force.

(Test Specification 2)

As shown in Table 2 below, the reproduction output changes were measured using perpendicular magnetic recording mediums of the trapezoidal convex-portion structure which were the same as those in Test Specification 1 while keeping them at the ordinary maximum keeping temperature of 60° C. Under this condition, KuV/kT=93.3.

In order to make clear the effect of the relational expressions of the present invention, Table 2 simultaneously shows signs of "Hc−β" and "Hc'−β" where β represents the expression on the right side of the foregoing inequality (2), and values of the coercive force squareness ratio S*. Hc'=Hc·S* and β is given by an equation (6) below.

$$\beta = 4Mr\left(\arctan\frac{L1\ W1}{t\sqrt{L1^2+W1^2+t^2}} + \arctan\frac{L2\ W2}{t\sqrt{L2^2+W2^2+t^2}}\right) \quad (6)$$

TABLE 2

| | L2 (nm) | L1 (nm) | W2 (nm) | W1 (nm) | Mr (emu/cc) | Hc (Oe) | Hc−β | Hc'−β | S* | Reproduction Output Change |
|---|---|---|---|---|---|---|---|---|---|---|
| Example 2-1 | 195 | 187 | 85 | 77 | 340 | 3740 | Positive | Positive | 1.0 | ○ |
| Example 2-2 | 195 | 187 | 85 | 77 | 340 | 3932 | Positive | Positive | 0.95 | ○ |
| Example 2-3 | 195 | 187 | 85 | 77 | 340 | 4156 | Positive | Positive | 0.90 | ○ |
| Example 2-4 | 195 | 187 | 85 | 77 | 340 | 4400 | Positive | Positive | 0.85 | ○ |
| Example 2-5 | 195 | 187 | 85 | 77 | 340 | 4675 | Positive | Positive | 0.80 | ○ |
| Comparative Example 2-1 | 195 | 187 | 85 | 77 | 340 | 3730 | 0 (Zero) | 0 (Zero) | 1.0 | x |
| Comparative Example 2-2 | 195 | 187 | 85 | 77 | 340 | 3905 | Positive | Negative | 0.95 | x |
| Comparative Example 2-3 | 195 | 187 | 85 | 77 | 340 | 4122 | Positive | Negative | 0.90 | x |
| Comparative Example 2-4 | 195 | 187 | 85 | 77 | 340 | 4365 | Positive | Negative | 0.85 | x |
| Comparative Example 2-5 | 195 | 187 | 85 | 77 | 340 | 3638 | Positive | Negative | 0.80 | x |
| Comparative Example 2-6 | 195 | 187 | 85 | 77 | 340 | 4987 | Positive | Positive | 0.75 | x |
| Comparative Example 2-7 | 195 | 187 | 85 | 77 | 340 | 4947 | Positive | Negative | 0.75 | x |

*Values of demagnetizing fields of samples (samples of trapezoidal convex portions) of Example 2-1 to Comparative Example 2-7 are all 3730(Oe).

| | L2 (nm) | L1 (nm) | W2 (nm) | W1 (nm) | Mr (emu/cc) | Hc (Oe) | Hc−β | Hc'−β | S* | Reproduction Output Change |
|---|---|---|---|---|---|---|---|---|---|---|
| Reference Example 2-1 | 195 | 195 | 85 | 85 | 340 | 3740 | Negative | Negative | 1.0 | x |
| Reference Example 2-2 | 195 | 195 | 85 | 85 | 340 | 3754 | 0 (Zero) | Negative | 1.0 | x |
| Reference Example 2-3 | 195 | 195 | 85 | 85 | 340 | 3932 | Positive | Negative | 0.95 | x |
| Reference Example 2-4 | 195 | 195 | 85 | 85 | 340 | 4156 | Positive | Negative | 0.90 | x |
| Reference Example 2-5 | 195 | 195 | 85 | 85 | 340 | 4400 | Positive | Negative | 0.85 | x |
| Reference Example 2-6 | 195 | 195 | 85 | 85 | 340 | 4675 | Positive | Negative | 0.80 | x |

*Values of demagnetizing fields of samples (samples of rectangular convex portions) of Reference Example 2-1 to Reference Example 2-6 are all 3754(Oe).

In Table 2, in addition to Comparative Examples each using a perpendicular magnetic recording layer having the truncated quadrangular pyramid shape but not satisfying the given relational expression of the present invention, there are shown Reference Examples 2-1 to 2-6 each using a perpendicular magnetic recording layer having the conventional rectangular structure.

As seen from the results shown in Table 2, it has been confirmed that, in the perpendicular magnetic recording layer of the truncated quadrangular pyramid shape satisfying "Hc'−β>0", i.e. the relationship given by the inequality (6), and further satisfying "S*≧0.8", the demagnetization is suppressed even under the condition of the ordinary maximum keeping temperature so that the effect of the present invention can be achieved. On the other hand, when S*=0.75, the coercive force increases while the squareness ratio (Mr/Ms) decreases, and the expected property cannot be obtained.

(Test Specification 3)

The reproduction output changes of the GMR heads were measured by changing parameters of the perpendicular magnetic recording layer of the truncated quadrangular pyramid shape corresponding to each of the patterns, as shown in FIG. 5, of the ISG portion, the SVAM portion, the Gray code portion, and the like in the servo area and values of the coercive force Hc and the coercive force squareness ratio S* in the direction perpendicular to the film plane of the perpendicular magnetic recording layer. The results are shown in Table 3 below.

The standard of the reproduction output change was such that, like in Test Specification 1, "x" was assigned to a reduction by 10% or more from the initial output after the lapse of three months, while "○" was assigned to a reduction by less than 10%. As an acceleration test, using the medium that exhibits KuV/kT=80 at 70° C. which is higher than an ordinary maximum keeping temperature of 60° C., the measurement was carried out under the condition of KuV/kT=70 at 80° C.

In order to make clear the effect of the relational expressions of the present invention, Table 3 simultaneously shows signs of "Hc−γ" and "Hc'−γ" where γ represents the expression on the right side of the foregoing inequality (3), and values of the coercive force squareness ratio S*. Hc'=Hc·S* and γ is given by an equation (7) below.

$$\gamma = 4Ms\left(\arctan\frac{L1}{t} + \arctan\frac{L2}{t}\right) \quad (7)$$

TABLE 3

| | L2 (nm) | L1 (nm) | Ms (emu/cc) | Hc (Oe) | Hc-γ | Hc'-γ | S* | Reproduction Output Change |
|---|---|---|---|---|---|---|---|---|
| Example 3-1 | 195 | 187 | 350 | 4300 | Positive | Positive | 1.0 | ○ |
| Example 3-2 | 195 | 187 | 350 | 4420 | Positive | Positive | 0.95 | ○ |
| Example 3-3 | 195 | 187 | 350 | 4677 | Positive | Positive | 0.90 | ○ |
| Example 3-4 | 195 | 187 | 350 | 4940 | Positive | Positive | 0.85 | ○ |
| Example 3-5 | 195 | 187 | 350 | 5261 | Positive | Positive | 0.80 | ○ |
| Comparative Example 3-1 | 195 | 187 | 350 | 4179 | 0 (Zero) | 0 (Zero) | 1.0 | x |
| Comparative Example 3-2 | 195 | 187 | 350 | 4367 | Positive | Negative | 0.95 | x |
| Comparative Example 3-3 | 195 | 187 | 350 | 4610 | Positive | Negative | 0.90 | x |
| Comparative Example 3-4 | 195 | 187 | 350 | 4881 | Positive | Negative | 0.85 | x |
| Comparative Example 3-5 | 195 | 187 | 350 | 5186 | Positive | Negative | 0.80 | x |
| Comparative Example 3-6 | 195 | 187 | 350 | 5599 | Positive | Positive | 0.75 | x |
| Comparative Example 3-7 | 195 | 187 | 350 | 5532 | Positive | Negative | 0.75 | x |

*Values of demagnetizing fields of samples (samples of trapezoidal convex portions) of Example 3-1 to Comparative Example 3-7 are all 4179(Oe).

As seen from the results shown in Table 3, it has been confirmed that, in the perpendicular magnetic recording layer of the truncated quadrangular pyramid shape satisfying "Hc'−γ>0", i.e. the relationship given by the inequality (7), and further satisfying "S*≧0.8", the demagnetization is suppressed even under the condition that is more severe than the ordinary keeping condition so that the effect of the present invention can be achieved. On the other hand, when S*=0.75, the coercive force increases while the squareness ratio (Mr/Ms) decreases, and the expected property cannot be obtained.

(Test Specification 4)

As shown in Table 4 below, the reproduction output changes were measured using perpendicular magnetic recording mediums of the trapezoidal convex-portion structure which were the same as those in Test Specification 3 while keeping them at the ordinary maximum keeping temperature of 60° C. Under this condition, KuV/kT=93.3.

In order to make clear the effect of the relational expressions of the present invention, Table 4 simultaneously shows signs of "Hc−ε" and "Hc'−ε" where ε represents the expression on the right side of the foregoing inequality (4), and values of the coercive force squareness ratio S*. Hc'=Hc·S* and ε is given by an equation (8) below.

$$\varepsilon = 4Mr\left(\arctan\frac{L1}{t} + \arctan\frac{L2}{t}\right) \quad (8)$$

TABLE 4

| | L2 (nm) | L1 (nm) | Mr (emu/cc) | Hc (Oe) | Hc-ε | Hc'-ε | S* | Reproduction Output Change |
|---|---|---|---|---|---|---|---|---|
| Example 4-1 | 195 | 187 | 340 | 4200 | Positive | Positive | 1.0 | ○ |
| Example 4-2 | 195 | 187 | 340 | 4295 | Positive | Positive | 0.95 | ○ |
| Example 4-3 | 195 | 187 | 340 | 4533 | Positive | Positive | 0.90 | ○ |
| Example 4-4 | 195 | 187 | 340 | 4812 | Positive | Positive | 0.85 | ○ |
| Example 4-5 | 195 | 187 | 340 | 5113 | Positive | Positive | 0.80 | ○ |
| Comparative Example 4-1 | 195 | 187 | 340 | 4060 | 0 (Zero) | 0 (Zero) | 1.0 | x |
| Comparative Example 4-2 | 195 | 187 | 340 | 4242 | Positive | Negative | 0.95 | x |
| Comparative Example 4-3 | 195 | 187 | 340 | 4478 | Positive | Negative | 0.90 | x |
| Comparative Example 4-4 | 195 | 187 | 340 | 4741 | Positive | Negative | 0.85 | x |
| Comparative Example 4-5 | 195 | 187 | 340 | 5038 | Positive | Negative | 0.80 | x |
| Comparative Example 4-6 | 195 | 187 | 340 | 5453 | Positive | Positive | 0.75 | x |
| Comparative Example 4-7 | 195 | 187 | 340 | 5373 | Positive | Negative | 0.75 | x |

*Values of demagnetizing fields of samples (samples of trapezoidal convex portions) of Example 4-1 to Comparative Example 4-7 are all 4060(Oe).

As seen from the results shown in Table 4, it has been confirmed that, in the perpendicular magnetic recording layer of the truncated quadrangular pyramid shape satisfying "Hc'−ε>0", i.e. the relationship given by the inequality (8), and further satisfying "S*≧0.8", the demagnetization is suppressed even under the condition of the ordinary maximum keeping temperature so that the effect of the present invention can be achieved. On the other hand, when S*=0.75, the coercive force increases while the squareness ratio (Mr/Ms) decreases, and the expected property cannot be obtained.

The effects of the present invention are clear from the foregoing results. Specifically, the magnetic recording and reproducing apparatus of the present invention is configured such that the convex structure, where the servo signal is recorded, of the perpendicular magnetic recording medium is set to the truncated quadrangular pyramid shape and the specification of the truncated quadrangular pyramid shape and so forth are determined according to the properties of the perpendicular magnetic recording medium to be used, so that the influence of the demagnetizing field that accelerates the thermal fluctuation of the perpendicular magnetic recording medium can be reduced in the servo area of the medium which is most affected by the thermal fluctuation of the medium. Therefore, it is possible to suppress degradation of the servo signal caused by the thermal fluctuation of the magnetization of the perpendicular magnetic recording layers forming the convex-concave structure in the servo area to thereby ensure the stable servo function over the long term.

The magnetic recording and reproducing apparatus of the present invention is particularly used as a component of a computer and can be utilized in the apparatus industry for information recording.

What is claimed is:

1. A magnetic recording and reproducing apparatus comprising a magnetic recording medium having a data information recording portion and a servo information portion for tracking, and a magnetic head for detecting servo information of said servo information portion and recording and reproducing data information on and from said data information recording portion, wherein said servo information portion is composed of perpendicular magnetic recording layers formed by convex portions based on a predetermined convex-concave pattern, said servo information portion comprising a burst portion where burst signals for tracking are recorded, said burst portion is formed by disposing at predetermined positions the perpendicular magnetic recording layers in the form of the convex portions where the burst signals are recorded, said perpendicular magnetic recording layer in the form of the convex portion has a first and a second substantially trapezoidal shape in a track width direction (track radial direction) and in a track circumferential direction, respectively, and when an upper side corresponding to an upper surface of said perpendicular magnetic recording layer in the form of the convex portion is given as W1 and a lower side corresponding to a lower surface of said perpendicular magnetic recording layer in the form of the convex portion is given as W2 in said first trapezoidal shape in the track width direction, an upper side corresponding to the upper surface of said perpendicular magnetic recording layer in the form of the convex portion is given as L1 and a lower side corresponding to the lower surface of said perpendicular magnetic recording layer in the form of the convex portion is given as L2 in said second trapezoidal shape in the track circumferential direction, a thickness of said perpendicular magnetic recording layer in the form of the convex portion is given as t (equal to a height from W2 being the lower side of said convex magnetic recording layer to W1 being the upper side thereof, and equal to a height from L2 to L1), and a coercive force, a saturation magnetization, and a coercive force squareness ratio in a direction perpendicular to the film plane of said perpendicular magnetic recording layer in the form of the convex portion are given as Hc, Ms, and S*, respectively, a specification of said burst portion is set so that said coercive force squareness ratio S* takes a value of 0.8 or more and a relationship of a first inequality is satisfied, said first inequality given as $$Hc \cdot S^* > 4Ms\left(\arctan\frac{L1 \; W1}{t\sqrt{L1^2+W1^2+t^2}}+\arctan\frac{L2 \; W2}{t\sqrt{L2^2+W2^2+t^2}}\right).$$

2. A magnetic recording and reproducing apparatus according to claim 1, wherein when a coercive force, a residual magnetization, and a coercive force squareness ratio in the direction perpendicular to the film plane of said perpendicular magnetic recording layer in the form of the convex portion are given as Hc, Mr, and S*, respectively, the specification of said burst portion is set so that said coercive force squareness ratio S* takes the value of 0.8 or more and a relationship of a second inequality is satisfied, said second inequality given as $$Hc \cdot S^* > 4Mr\left(\arctan\frac{L1 \; W1}{t\sqrt{L1^2+W1^2+t^2}}+\arctan\frac{L2 \; W2}{t\sqrt{L2^2+W2^2+t^2}}\right).$$

3. A magnetic recording and reproducing apparatus according to claim 2, wherein a relationship of W2>W1 and L2>L1 is satisfied.

4. A magnetic recording and reproducing apparatus according to claim 3, wherein when an interval between the adjacent perpendicular magnetic recording layers each in the form of the convex portion in said track circumferential direction is given as L3, the sum of L2 and L3 is set as a wavelength of frequency of a servo signal.

5. A magnetic recording and reproducing apparatus according to claim 1, wherein a relationship of W2>W1 and L2>L1 is satisfied.

6. A magnetic recording and reproducing apparatus according to claim 5, wherein when an interval between the adjacent perpendicular magnetic recording layers each in the form of the convex portion in said track circumferential direction is given as L3, the sum of L2 and L3 is set as a wavelength of frequency of a servo signal.

7. A magnetic recording and reproducing apparatus according to claim 1, wherein recording of servo signals in said servo information portion is carried out at a time by applying a magnetic field perpendicular to the plane of said perpendicular magnetic recording layers of said magnetic recording medium in a DC magnetic field.

8. A magnetic recording and reproducing apparatus according to claim 1, wherein said servo information portion is formed into the predetermined convex-concave pattern and a nonmagnetic material for providing a discrete function is filled in concave portions.

9. A magnetic recording and reproducing apparatus comprising a magnetic recording medium having a data information recording portion and a servo information portion for tracking, and a magnetic head for detecting servo information of said servo information portion and recording and reproducing data information on and from said data information recording portion, wherein said servo information portion is composed of perpendicular magnetic recording layers formed by convex portions based on a predetermined convex-concave pattern, said servo information portion is formed by disposing at predetermined positions the perpendicular magnetic recording layers in the form of the convex portions where servo signals are recorded, said perpendicular magnetic recording layers in the form of the convex portions including belt-like convex portions each extending in a track radial direction (track width direction), said belt-like convex portion has a trapezoidal shape with its upper side given as L1 and its lower side given as L2 in a track circumferential direction and has a length 100 times or more a length of L2 in the track radial direction, and when a thickness of said perpendicular magnetic recording layer in the form of the belt-like convex portion is given as t (equal to a height from L2 being the lower side of said convex magnetic recording layer to L1 being the upper side thereof), and a coercive force, a saturation magnetization, and a coercive force squareness ratio in a direction perpendicular to the film plane of said perpendicular magnetic recording layer in the form of the belt-like convex portion are given as Hc, Ms, and S*, respectively, a specification of said belt-like convex portion is set so that said coercive force squareness ratio S* takes a value of 0.8 or more and a relationship of a third inequality is satisfied, said third inequality given as $$Hc \cdot S^* > 4Ms\left(\arctan\frac{L1}{t}+\arctan\frac{L2}{t}\right).$$

10. A magnetic recording and reproducing apparatus according to claim 9, wherein when a coercive force, a residual magnetization, and a coercive force squareness ratio in the direction perpendicular to the film plane of said perpendicular magnetic recording layer in the form of the belt-like convex portion are given as Hc, Mr, and S*, respectively, the specification of said belt-like convex portion is set so that said coercive force squareness ratio S* takes the value of 0.8 or more and a relationship of a fourth inequality is satisfied, said fourth inequality given as $$Hc \cdot S^* > 4Mr\left(\arctan\frac{L1}{t}+\arctan\frac{L2}{t}\right).$$

11. A magnetic recording and reproducing apparatus according to claim 10, wherein a relationship of L2>L1 is satisfied.

12. A magnetic recording and reproducing apparatus according to claim 11, wherein when an interval between the adjacent perpendicular magnetic recording layers each in the form of the belt-like convex portion in said track circumferential direction is given as L3, the sum of L2 and L3 is set as a wavelength of frequency of the servo signal.

13. A magnetic recording and reproducing apparatus according to claim 10, wherein when an interval between the adjacent perpendicular magnetic recording layers each in the form of the belt-like convex portion in said track circumferential direction is given as L3, the sum of L2 and L3 is set as a wavelength of frequency of the servo signal.

14. A magnetic recording and reproducing apparatus according to claim 9, wherein a relationship of L2>L1 is satisfied.

15. A magnetic recording and reproducing apparatus according to claim 14, wherein when an interval between the adjacent perpendicular magnetic recording layers each in the form of the belt-like convex portion in said track circumferential direction is given as L3, the sum of L2 and L3 is set as a wavelength of frequency of the servo signal.

16. A magnetic recording and reproducing apparatus according to claim 9, wherein when an interval between the adjacent perpendicular magnetic recording layers each in the form of the belt-like convex portion in said track circumferential direction is given as L3, the sum of L2 and L3 is set as a wavelength of frequency of the servo signal.

17. A magnetic recording and reproducing apparatus according to claim 9, wherein recording of the servo signals in said servo information portion is carried out at a time by applying a magnetic field perpendicular to the plane of said perpendicular magnetic recording layers of said magnetic recording medium in a DC magnetic field.

18. A magnetic recording and reproducing apparatus according to claim 9, wherein said servo information portion is formed into the predetermined convex-concave pattern and a nonmagnetic material for providing a discrete function is filled in concave portions.

* * * * *